Inventor
FERDINAND HERMAN BERGER.
By Ralzemond A. Parker
Attorney

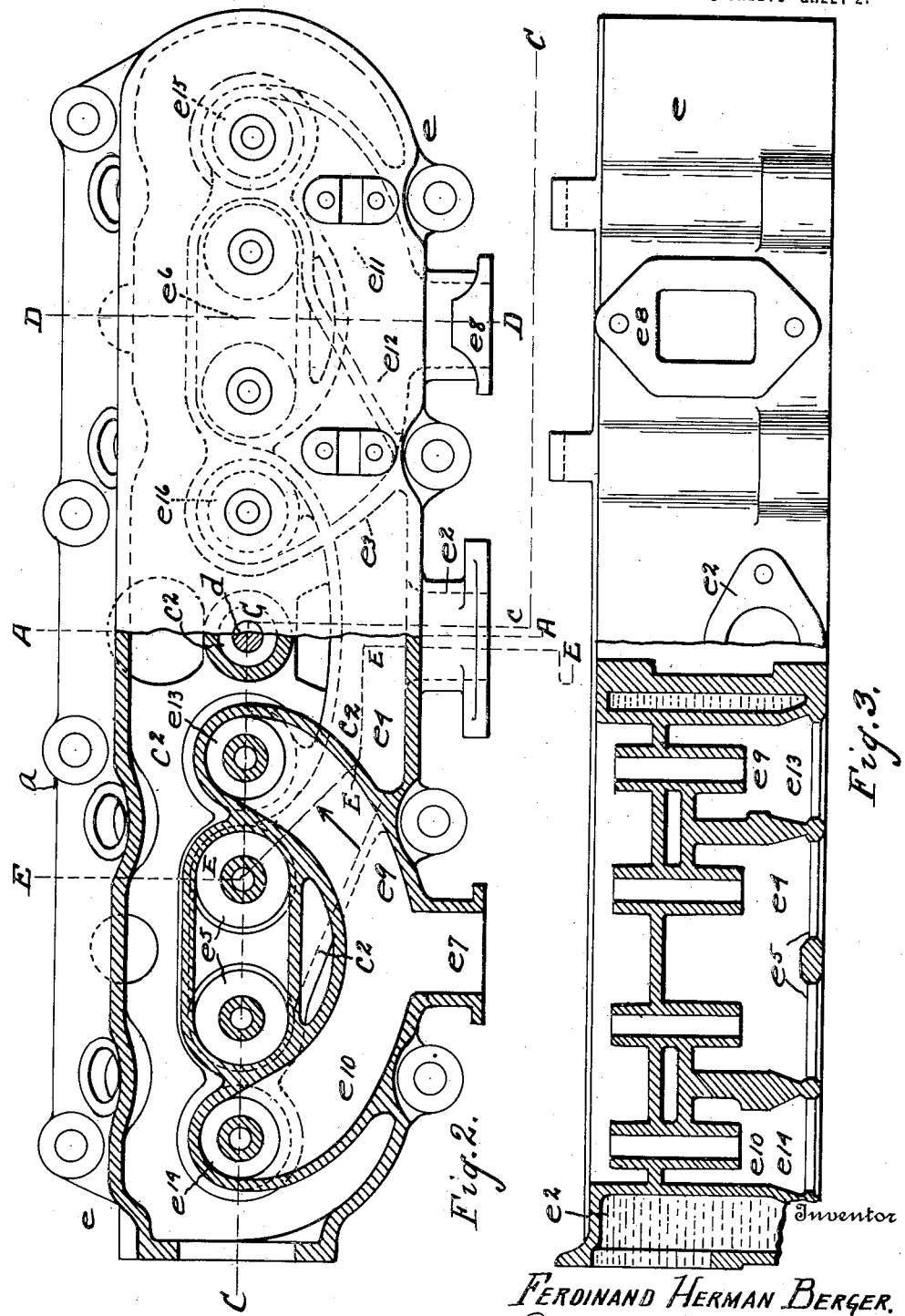

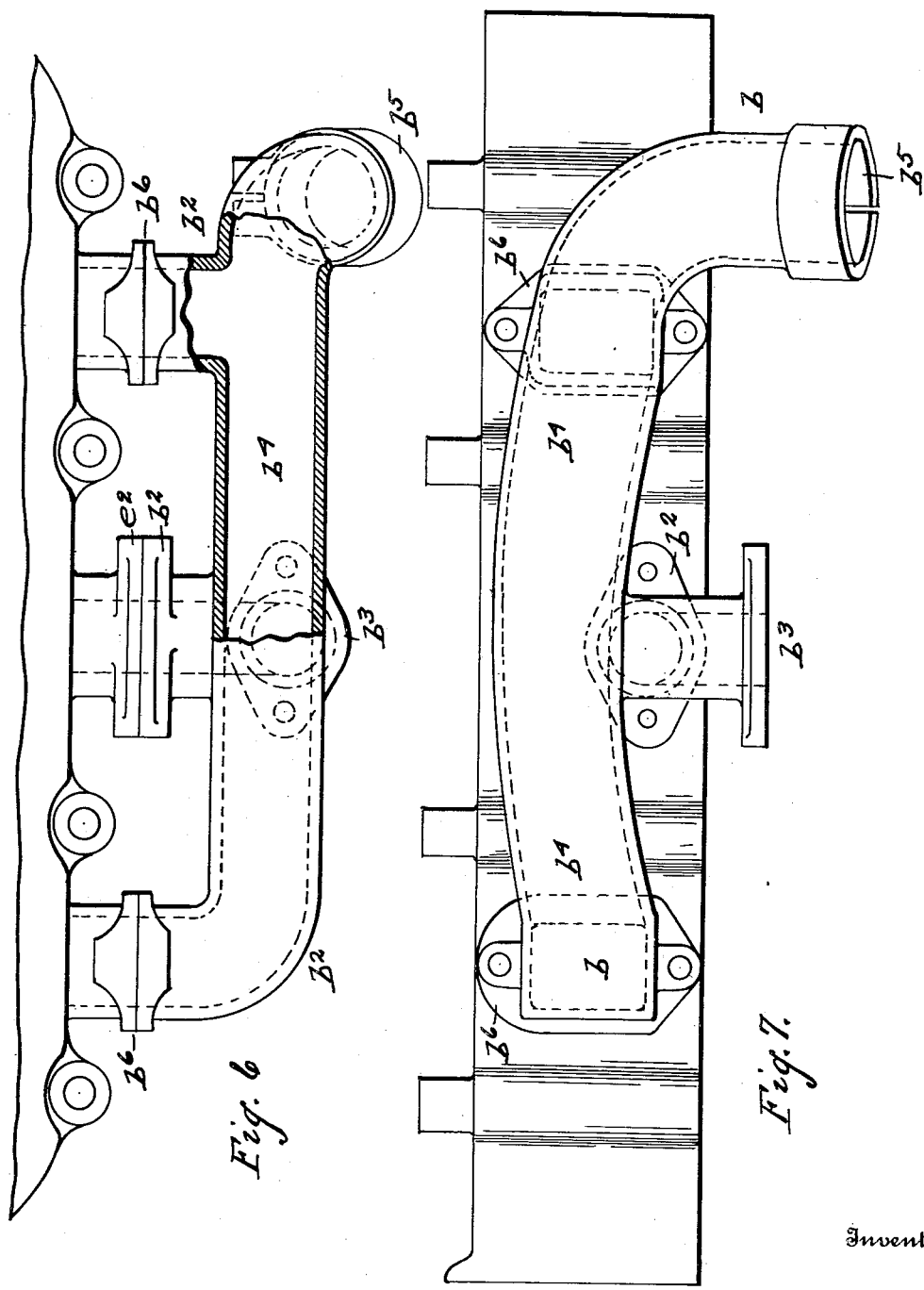

UNITED STATES PATENT OFFICE.

FERDINAND HERMAN BERGER, OF DETROIT, MICHIGAN.

INTERNAL-COMBUSTION ENGINE.

1,412,266.  Specification of Letters Patent.  Patented Apr. 11, 1922.

Application filed January 30, 1919. Serial No. 273,973.

*To all whom it may concern:*

Be it known that I, FERDINAND HERMAN BERGER, a citizen of Germany, residing at Detroit, county of Wayne, State of Michigan, have invented a certain new and useful Improvement in Internal-Combustion Engines, and declare the following to be a full, clear, and exact description of the same, such as will enable others skilled in the art to which it pertains to make and use the same, reference being had to the accompanying drawings, which form a part of this specification.

My invention relates to internal combustion engines and an object of my improvements is to provide an improved construction for the head of engines of the multiple cylinder type.

I accomplish this object in the device illustrated in the accompanying drawings in which:

Figure 2 is a plan view of the head of the same, partly in section, on the line B—B of Fig. 1.

Figure 3 is an elevation partly in section on the line C—C of Fig. 2.

Figure 6 is a plan view of a portion of the engine showing the exhaust manifold partly broken away.

Figure 7 is an elevation of the same showing the exhaust manifold and intake conduit secured in position upon the engine.

Figure 1:
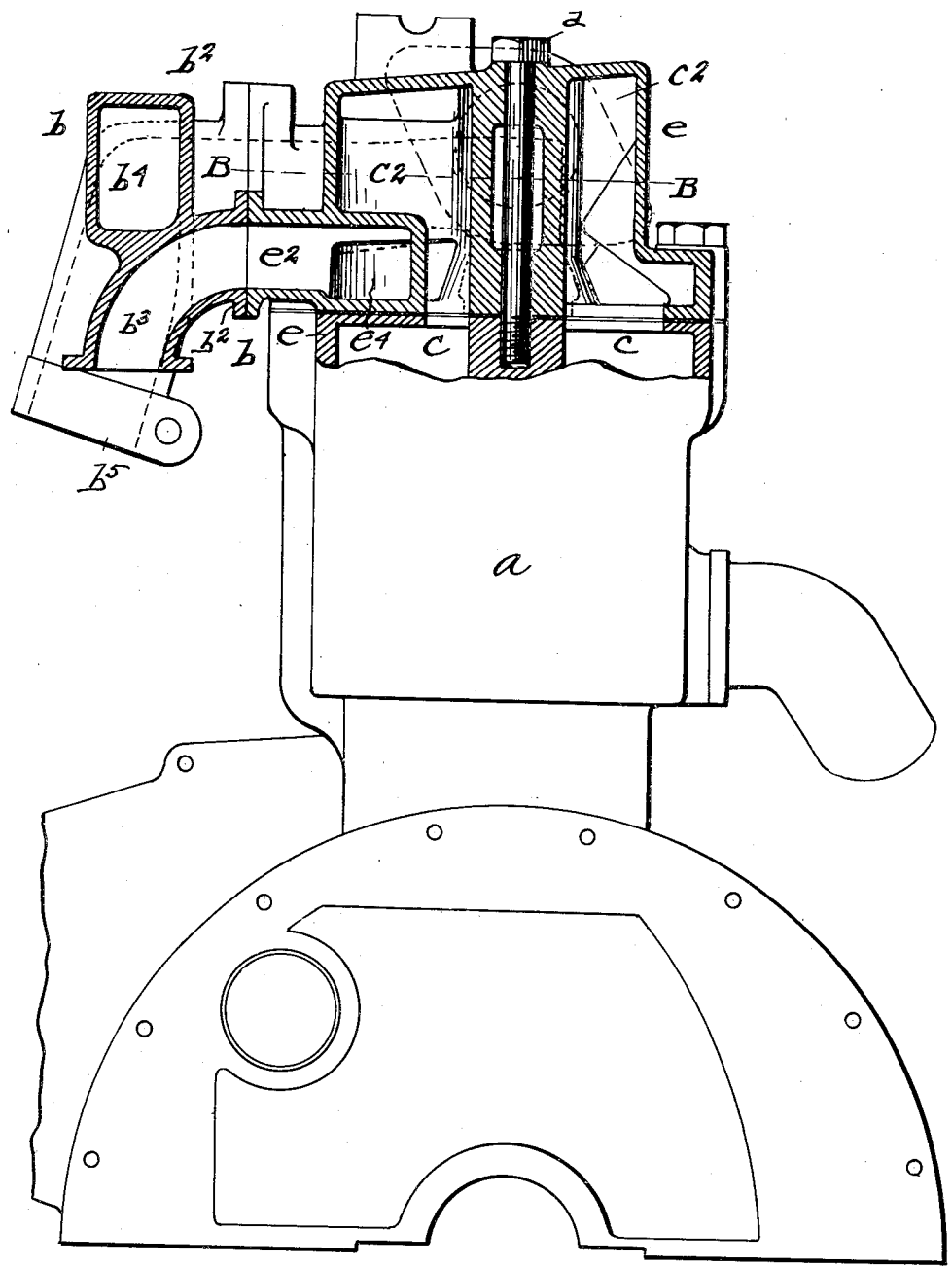
Figure 1 is an end elevation, partly in section on the line A—A of Fig. 2, of an engine embodying my invention.
Figure 4:
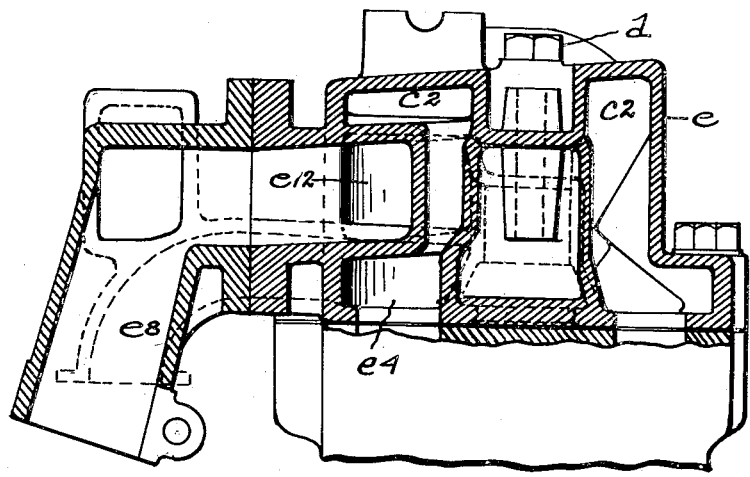
Figure 4 is a section of the upper part of the engine on the line D—D Fig. 2.
Figure 5:
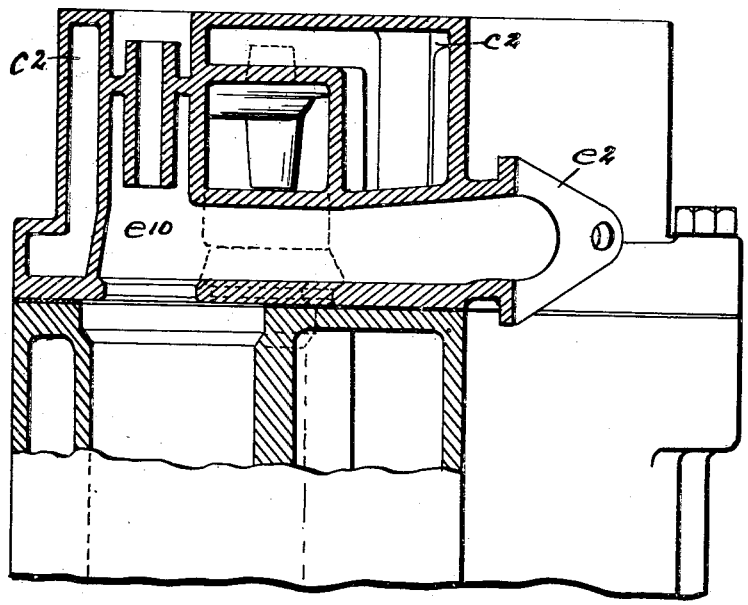
Figure 5 is a section on the line E—E—E—E—E Fig. 2 looking in the direction of the arrow.

$a$ is the cylinder casting for the engine, in this case one having four cylinders. $d$ is a bolt extending through the bolt hole through the center of the cover $e$ and engaging in the top of the cylinder, as shown in Figure 1. $c\ c$ are parts of the water jacket of the engine cylinders $a$ and these open into water passages $c^2\ c^2\ c^2$ in the cover for the engine. $e$ is the cylinder head. $e^2$ is an intake passage entering from the side of the head $e$ at the center and branching into passages $e^3$ and $e^4$ extending respectively to the right and left as shown in Figure 2. $e^5$ are intake ports for the two left hand cylinders and $e^6$ are the intake ports for the two right hand cylinders. The intake ports $e^5$ communicate with the inner end of the branch $e^4$ and the intake port $e^6$ with the inner end of the branch $e^3$. $e^7$ is an exhaust passage opening at the side of the head $e$ upon one side of the intake opening $e^2$, and $e^8$ is a similar exhaust passage opening into said cylinder head upon the other side of the intake passage $e^2$. The passage $e^7$ branches to the right and left in passages $e^9$ and $e^{10}$, the passage $e^9$ extending above the intake passage $e^4$ and communicating with an exhaust port $e^{13}$ to the inner one of the left hand pair of cylinders, and the passage $e^{10}$ opens to an exhaust port $e^{14}$ to the outer left hand cylinder.

The passage $e^8$ branches in the same way as the passage $e^7$, the branch $e^{12}$ extending above the branch $e^3$ of the intake passage and opening to an exhaust port $e^{16}$ and the branch $e^{12}$ extends to the right of the intake ports $e^6$ and opens to an exhaust port $e^{15}$ of the outer one of the right hand pair of cylinders.

$b$ is a casting containing the exhaust manifold $b^4$ and the intake passage $b^3$. $b^2$ is a securing flange around the end of the intake passage $b^3$. $b^6$ is a similar flange around the opening to the exhaust manifold $b^4$ and $b^6$ is third securing flange around a second side opening to the exhaust manifold $b^4$. The manifold $b^4$ is secured in place by the flange $b^2$ being secured to the casting $e$ adjacent to the intake passage $e^2$ so as to make the passage $b^3$ register with the passage $e^2$ and the flange $b^6$ adjacent to the exhaust opening $e^7$ and $e^8$ so as to make the lateral openings from the manifold $b^4$ register and communicate with the exhaust openings $e^7$ and $e^8$.

It will be observed that by the above construction the exhaust passages are brought to the outside of the cylinder head casting where heat may be readily dissipated therefrom and a branch of each of these passages extends over an intake passage so as to communicate its heat to the explosive mixture entering by said passage. There is a branch of the exhaust passage passing over each of the branches of the intake passage so that all of the ingoing mixture is heated thereby and each branch of the intake passage extends for some distance above the explosion chamber of a cylinder so that there is a heating surface upon each side of said passage.

A single casting serves for the exhaust manifold and the intake passage and this casting is secured by the three flanges and the usual bolts as one piece to the cylinder completing the construction.

Figure 8:
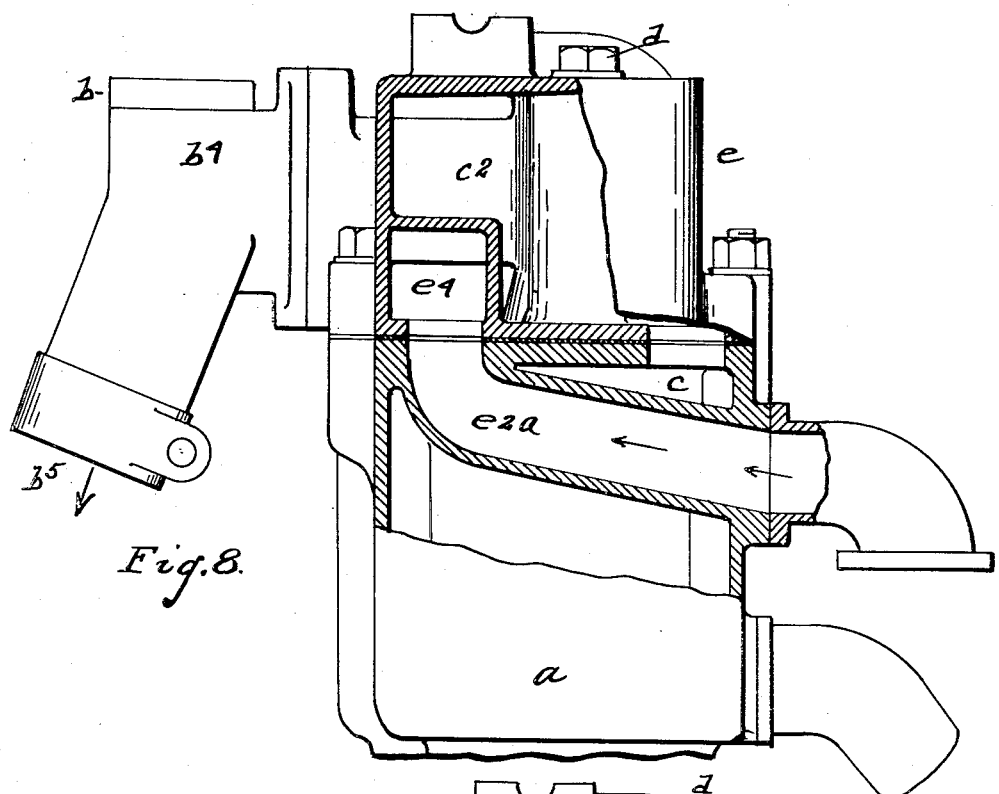
Figure 8 is a view corresponding to Figure 1 showing a modified construction.
Figure 9:
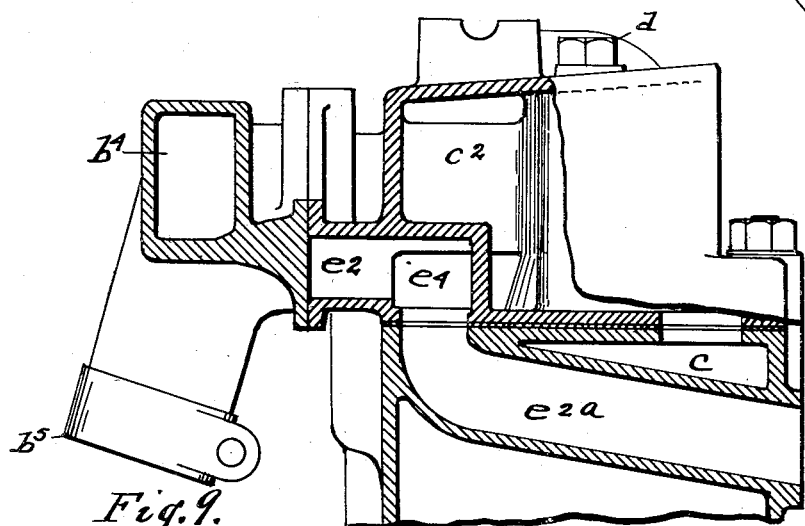
Figure 9 is a view similar to Figure 1 of a second modified construction.

In Figures 8 and 9 I have shown an intake passage $e^{2a}$ extending transversely of the cylinder casting between the second and third cylinders and opening upon the opposite side of said casting to that of the exhaust. With this construction the intake $e^2$ may be omitted as indicated in Figure 8, or it may still be present as shown in Figure 9, so that either the opening $e^2$ or $e^{2a}$ may be used, and of course both might be used.

What I claim is:

1. A cylinder head having an intake passage entering at the side thereof and branching in opposite directions, an exhaust passage entering said cylinder head upon one side of said intake passage and extending over one branch of said passage, an exhaust passage opening upon the other side of said intake passage and extending over the other branch of said intake passage.

2. A cylinder head having an intake passage entering at the side thereof and branching in opposite directions, an exhaust passage entering said cylinder head upon one side of said intake passage and extending over one branch of said passage, an exhaust passage opening upon the other side of said intake passage and extending over the other branch of said intake passage, said passages being adapted to have a manifold casting secured thereto, a manifold casting containing an exhaust passage and an intake passage, said manifold casting being adapted to be secured to said cylinder head with its intake passage registering with the intake passage of said cylinder head and its exhaust passage communicating with the exhaust passages of said cylinder head.

3. In a cylinder head for a four-cylinder engine, a pair of intake ports located toward one end of said head, a pair of intake ports located toward the other end of said cylinder head, a centrally located intake passage opening at the side of said cylinder head and having a branch communicating with one of said pairs of intake ports, and a branch extending in the other direction communicating with the other pair of said intake ports, an exhaust passage opening upon one side of said intake passages and branching in one direction and communicating with an exhaust port located upon one side of one said pairs of intake ports and branching in the other direction and communicating with an exhaust port upon the other side of said pair of intake ports, an exhaust passage opening upon the other side of said intake port and similarly located and constructed with reference to the other of said pair of intake ports, a branch of each of said exhaust ports extending above each of the branches of said intake port.

4. In a cylinder head for a four-cylinder engine, a pair of intake ports located toward one end of said head, a pair of intake ports located toward the other end of said cylinder head, a centrally located intake passage opening at the side of said cylinder head and having a branch communicating with one of said pairs of intake ports, and a branch extending in the other direction communicating with the other pair of said intake ports, an exhaust passage opening upon one side of said intake passages and branching in one direction and communicating with an exhaust port located upon one side of one of said pairs of intake ports and branching in the other direction and communicating with an exhaust port upon the other side of said pair of intake ports, an exhaust passage opening upon the other side of said intake port and similarly located and constructed with reference to the other of said pair of intake ports, a branch of each of said exhaust ports extending above each of the branches of said intake port, and an exhaust manifold having an intake passage, said intake manifold being adapted to be secure to said cylinder with its exhaust passages registering with the exhaust passages of said cylinder head and the intake passage with the intake passages of said cylinder head.

5. In a cylinder head, a pair of adjacent intake ports, a single passage communicating with said ports and opening to the side of said cylinder head at a distance laterally from said ports, an exhaust passage opening to the same side of said cylinder head as said intake passage and branching upon each side of said pair of intake ports, each of said branches opening to an exhaust port, one of said branches extending over said intake passage in position to communicate heat thereto.

6. In a cylinder head, a pair of adjacent intake ports, a single passage communicating with said ports and opening to the side of said cylinder head at a distance laterally from said ports, an exhaust passage opening to the same side of said cylinder head as said intake passage and branching upon each side of said pair of intake ports, each of said branches opening to an exhaust port, one of said branches extending over said intake passage in position to communicate heat thereto, said cylinder head being provided with cooling water passages adjaccent to said intake and exhaust passages.

In testimony whereof, I sign this specification.

FERDINAND HERMAN BERGER.